Jan. 13, 1925.
R. SPEAR ET AL
1,523,352
WAGON AND SIMILAR VEHICLE
Filed March 10, 1923    2 Sheets-Sheet 2
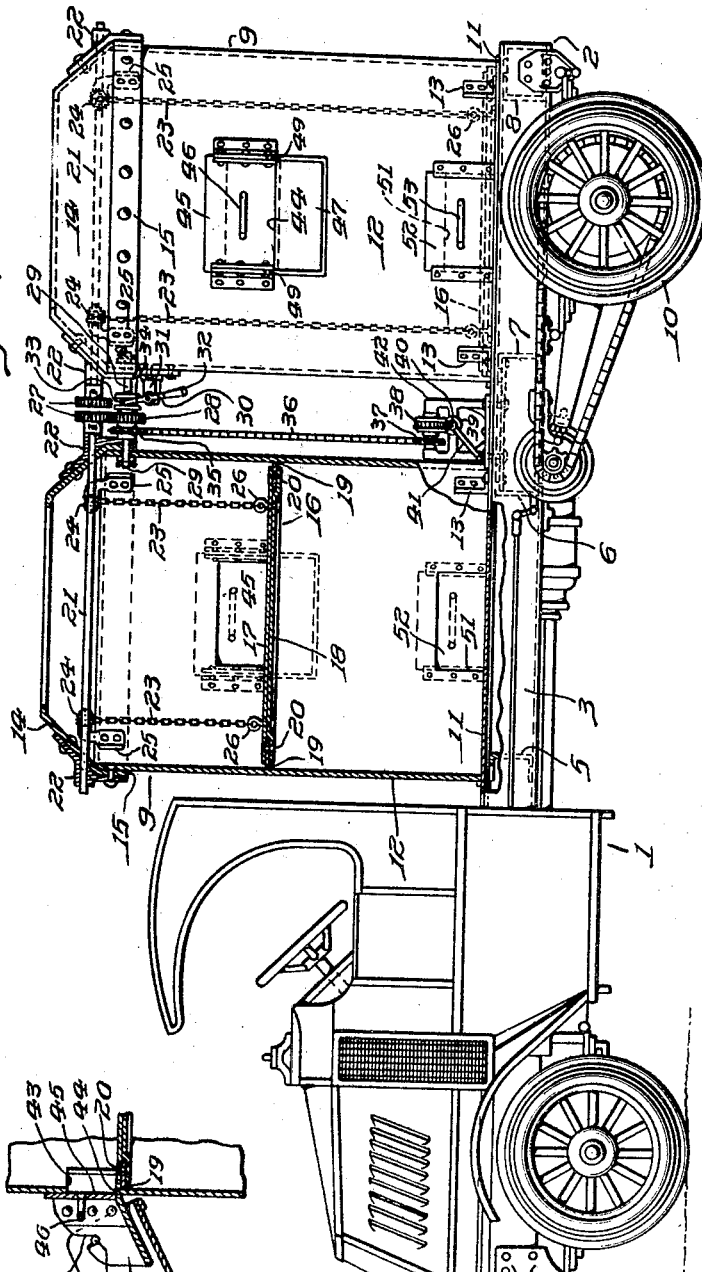
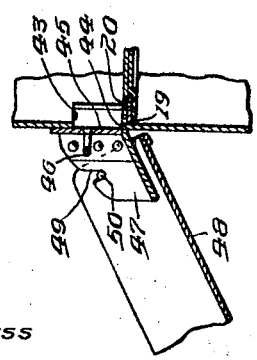
INVENTORS
Reginald Spear,
Albert A. Thompson,
BY
ATTORNEYS
WITNESS Patented Jan. 13, 1925.

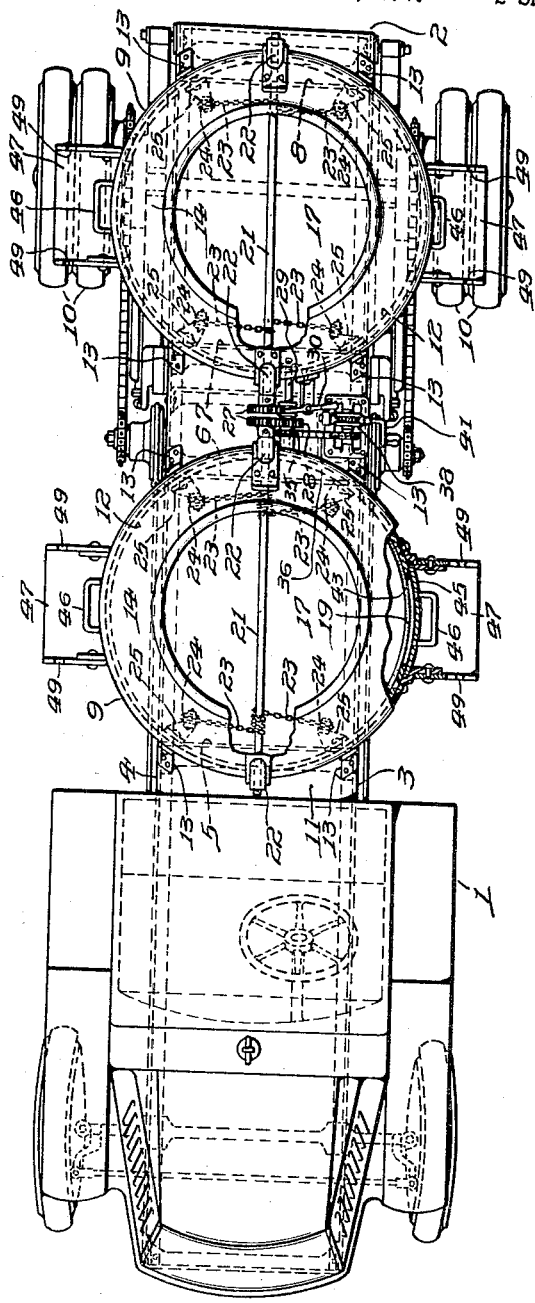

1,523,352

UNITED STATES PATENT OFFICE.

REGINALD SPEAR AND ALBERT A. THOMPSON, OF PHILADELPHIA, PENNSYLVANIA.

WAGON AND SIMILAR VEHICLE.

Application filed March 10, 1923. Serial No. 624,206.

*To all whom it may concern:*

Be it known that we, REGINALD SPEAR and ALBERT A. THOMPSON, both citizens of the United States, and residents of the city of Philadelphia, in the county of Philadelphia and State of Pennsylvania, have invented certain new and useful Improvements in Wagons and Similar Vehicles, of which the following is a specification.

Our invention relates to wagons and similar vehicles and more particularly to those wagons, which are used for the transportation of coal and similar materials, and from which the load may be discharged by gravity over an inclined trough or chute extending from a gate-controlled opening in the body to the point where the coal or other material is to be deposited.

Heretofore coal delivery wagons have been usually provided with a body which may be elevated above the running gear or chassis and tilted in the raised position in order to give to the chute or trough a sufficient inclination or pitch to cause the coal or other material to slide by gravity over or through the chute. Mechanism is usually provided for elevating the body above the truck or chassis from 3 to 6 feet. The entire body and the entire contents thereof have heretofore been lifted to the extent above indicated before the gate is opened and before any of the load is discharged to and through the chute. The lifting mechanism in such wagons is therefore made strong and powerful enough to lift the entire body completely filled with coal or other materials. This elevating mechanism must therefore be and is of relatively heavy construction which adds greatly to the weight of the vehicle. Moreover the body itself has to be made very strong and heavy.

It often happens that two or more orders of coal are loaded into a single wagon body, usually one at the forward end and the other at the rear end of the body with a suitable partition between them. If for any reason delivery cannot be made of the order which is in the rear end of the body, then it is often necessary to return the loaded vehicle to the yard and unload the rear end of the wagon before delivery can be made of the coal or other material in the forward end of the wagon. This often necessitates a double transportation of one of the orders with the attendant cost and delay.

The objects of our invention are to provide a self-dumping wagon, the body of which is rigid with the running rear or chassis and which is not raised or elevated to discharge the contents thereof through an inclined chute; to provide a body of a self-dumping wagon with a discharge opening in the sides of the vehicle and located sufficiently high from the ground and the chassis or running gear to impart the necessary inclination to the chute or trough through which the load may be discharged by gravity and to provide the body with a movable bottom which may be elevated by a suitable mechanism to the level of the lower edge of the opening in the side of the body; whereby when the gate or closure of the opening in the body is opened, without elevating the bottom a substantial part (nearly one-half) of the entire load will flow by gravity through the opening and through the chute, and whereby thereafter the movable bottom of the body and with it the balance of the load may be lifted until substantially all of the load is discharged from the body by gravity.

A further object of our invention is to make a body of a coal or similar wagon of two or more relatively independent units with independent movable bottoms and with discharge openings located at a height sufficient to impart the necessary inclination to a chute whereby only a little more than one-quarter of the full load is ever required to be lifted at one time; and to thus provide a construction whereby the body and the load lifting apparatus may be made of relatively light weight as compared with the weight of the dumping apparatus of ordinary wagons, without sacrificing strength or rigidity.

A further object of our invention is to arrange the gate-controlled discharge opening or openings in the side of the body or body units, as distinguished from being located at the tail of the wagon so that the wagon may be drawn up parallel and close to the curb and the load may be delivered by gravity through a chute with the wagon in that position. This is obviously a great advantage in saving time, in getting the vehicle in position to deliver the load, and in avoiding the turning of the vehicle in narrow, congested streets or the blocking of traffic.

Other objects of our invention will appear in the specification and claims below.

In the drawings forming a part of this specification and in which the same reference characters are employed to designate the same parts throughout the various views, Fig. 1 is a plan view of a wagon embodying our invention; Fig. 2 is a side elevation of the wagon shown in Fig. 1, with one of the body units shown in vertical cross-section; and Fig. 3 is a vertical sectional view of a fragment of a body unit showing the opening in the side thereof, the gate or closure therefor, the short chute or spout rigid with the side of the body unit and a fragment of the long movable portable chute, one end of which is suspended upon the short rigid chute of the body, when the load is being discharged by gravity.

Since our invention relates to many vehicles, whether motor driven or drawn by horses or by any other suitable power, in the drawings we have shown our invention as adapted to a standard automobile truck.

The truck 1 may be of any suitable standard type having a frame 2 composed of side members 3 and 4 and cross bars or members 5, 6, 7 and 8, the latter being preferably so disposed as to form a part of the support for the body units 9—9 mounted thereon. Preferably the top of the frame 2 is a little above the top of the wheels 10.

Secured to the top of the frame 2 is preferably a sheet of metal forming the flooring 11. This flooring may be very light because it is not required to support the weight of the load or of the body, as will appear below.

These two body units 9 are preferably identical in construction, and each preferably comprises an open-ended cylinder 12 mounted on the frame 2 with its axis vertical. Each cylinder 12 is preferably seamless and the bottom end thereof rests on the side members 3 and 4 of the frame with the sheet metal flooring 11 between the cylinder and the frame. Each cylinder 12 may be and preferably is rigidly secured and held in place by brackets 13 bolted or riveted to the side members 3 and 4 and to the cross bars thereunder. The upper end of each cylinder may be and preferably is provided with a conical top 14 provided with a cylindrical flange 15 forming a band which is rigidly bolted or riveted to the upper edge of the cylinder.

Within each cylinder is a movable bottom 16 composed preferably of two circular plates 17, 18 of sheet metal, with a ring or gasket 19 held therebetween by suitable rivets 20 by means of which the said plates are also secured together. The outer periphery of the ring 19, which may be made of leather, rubber or other suitable material, is adapted to bear on the smooth cylindrical surface of the inner walls of the body unit and close the space between the periphery of the plates 17, 18 and the interior of the cylinders.

Near or at the top of each body unit 9 is a shaft 21 mounted to turn in bearings 22, 22 preferably rigidly bolted to the top of the cylinders 12 through the cylindrical flange 15 of the conical members 14. To each shaft 21 is attached one end of four chains 23. Each chain 23 has one end attached to the shaft 20 and thence passes horizontally over a guide or sheave pulley 24 rotatably mounted on a suitable bracket 25 rigidly secured to the top of the cylinder and the flange 15 and then passes downwardly vertically in the cylinder. The lower end of each chain 23 is permanently attached to the movable bottom 16, as by a hook or eye 26. One end of each chain of a pair of chains is attached to the shaft 21 on diametrically opposite sides of the shaft, so that as the shaft 21 is turned in one direction, both chains will wrap or coil around the shaft 21 and elevate or lift the movable bottom 16 to which said chains are attached, and when the shaft is turned in the opposite direction, the coils will unwind and lower the movable bottom.

On the end of each shaft 21 is a spur gear 27 adapted to be engaged by a spur gear 28 mounted on the short counter-shaft 29 extending between the body units. This spur gear 28 is preferably longitudinally slidable on the counter-shaft 29 and the position thereof may be determined in any suitable manner, as by a pivoted lever 30 mounted on a bracket 31 secured to the outside of a body unit 9, one end of said lever 30 being provided with a handle 32, and the other end with a fork 33 riding in the groove 34 on the hub of the gear 28. Rigid with the gear 28 is a sprocket wheel 35 over which passes a sprocket chain 36 which also passes around the lower sprocket wheel 37 rigid with a worm gear 38 which in turn meshes with a worm 39 carried by a shaft 40, the outer end of which is provided with a crank or handle 41. The sprocket wheel 37, worm gear 38, worm 39 and shaft 40 are preferably mounted in a bracket 42 rigidly secured to the frame of the chassis. By throwing the handle 32 of the lever 30 in one direction, the spur gear 28 may be thrown into mesh with the spur gear 27 on the shaft 21 of one body unit 9 and by throwing it in the opposite direction, the gear 28 may be thrown into mesh with the spur gear 27 on the shaft 21 of the other body member 9.

The opposite sides of each body member or unit 9 are preferably provided with a discharge or delivery opening 43 preferably substantially rectangular in shape and preferably so located that the lower edge 44 thereof is three or four feet above the frame of the truck, that is to say, substantially as high as the bottom of a coal wagon is usually elevated in order to discharge the contents over a chute by gravity. Each opening 43 is provided with a gate or closure 45 which may be raised and lowered at will by a handle 46 to open and close the opening 43.

Around each opening 43 may be rigidly secured a spout or short chute 47 preferably provided with some means for connecting thereto one end of a long portable chute 48, as for instance, the notches 49 adapted to receive studs 50 of the long portable chute 48.

These delivery openings 43 are preferably on opposite sides of the wagon and not at the rear end of the body as they are usually arranged in dumping wagons. To make a delivery of the contents of the truck, it is not necessary to back the truck or wagon up against the curb. The truck may be drawn up alongside and parallel to the curb and the contents may be conducted by a chute from the side of either body unit or section to any suitable point.

Each body unit may also be provided with one or more lower discharge openings 51 adapted to be opened and closed by a gate or closure 52 provided with a handle 53. This latter opening 48 is also for the purpose of giving access to the space between the movable bottom 16 and the floor 11 of sheet metal for the purpose of removing any accumulation of fine coal or dirt which might crowd between the gasket 19 and the sides of the cylinders and be retained there by the flooring 11.

The operation of our invention is as follows, assuming both body units 9 to be filled with coal, and the movable bottoms 16 to be in their lowest position, viz., resting on the floor 11. Upon arrival at the place where a delivery of coal is to be made, the driver draws the wagon up against and parallel to the curb. He then hangs one end of the movable chute 48 on the spout or smaller chute 47 of the body containing the coal to be delivered. He then opens the gate 45 whereupon a great part of the coal in that unit above the lower edge 44 flows through the opening 43 and slides down the chute 48. A large fraction (probably more than one-quarter) of the contents of that unit will thus flow by gravity out of the body-unit and down the chute 48 without any elevation of the movable bottom 16. At this point the operator will then move the handle 32 of the lever 30 to throw the spur gear 28 into mesh with the spur gear 27 of that unit, and then revolve the crank or handle 41. This will revolve the shaft 21, winding the chains 23 around the shaft 21 and elevating the movable bottom 16. As the movable bottom 16 rises, the contents will continue to flow out of the body section until the bottom has reached the lower edge 41 of the opening. Whatever coal then remains in the body section may be readily shoveled, scraped or swept out over the smooth bottom 16 out of the opening 43 into the chute 48 in the usual manner.

From the above it will be seen that when the wagon is provided with two body sections it will never be necessary to provide a heavier or stronger lifting mechanism than that which would be required to lift much more than one-half of a full load on the wagon, because the lower edge 44 of the openings 43 are preferably about midway between the ends of the cylinders 12 so that nearly one-half of the contents of a unit will flow out of the unit, and down the chute upon opening the gate 45. The lifting mechanism may therefore be made relatively light and the total weight of the vehicle correspondingly reduced.

A cylindrical body rigidly bolted to the chassis or frame of a truck provides a very rigid and strong construction, but at the same time it is an exceedingly light-weight construction. The body being thus rigid with the chassis may be made considerably lighter than those bodies adapted to be lifted in the usual manner. This also makes for lightness in the truck or wagon as a whole. The conical tops 14 are for the purpose of making the upper ends of the cylinders where the lifting shafts and studs are secured thereto, strong and rigid, and also for the purpose of preventing the coal or contents of the body sections from spilling over the top of the unit when the false bottoms are elevated faster than the coal flows out through the openings. They tend to keep the load toward the middle of the cylinder if the load is lifted sufficiently to bring the upper part thereof into engagement with the conical tubes. They also serve to prevent the contents from being shaken over the tops of the units during transportation. It will thus be seen that we have provided a construction which has many advantages over the ordinary type of coal or dumping wagons. The body members or units may be mounted upon any suitable truck, chassis, car or wagon gear and the contents of one may be discharged by gravity without disturbing the contents of the other body-section or unit.

In the drawings, the points where the chains 23 are attached to the movable bottom 16 are shown for the sake of clearness as symmetrically disposed around the periphery of the bottom but not equally spaced from each other. This was for the sake of clearness in illustrating the construction, but it is to be understood that the guide or sheave pulleys 24 and hooks or eyes 26 may be placed at any desired position around the periphery of the bottom and equally spaced from each other whenever desired, without departing from the spirit and scope of the invention.

Having thus described our invention, what we claim and desire to protect by Letters Patent of the United States is:

1. In a vehicle, the combination with the chassis or running gear, of a body having substantially perpendicular side walls provided with a lateral discharge opening therethrough, the lower edge of said opening being relatively high in said wall, a closure for said opening, a bottom arranged to move vertically within said body, and means to raise said bottom up to the lower edge of said discharge opening.

2. In a vehicle, the combination with the chassis or running gear, of a body having substantially perpendicular side walls provided with a discharge opening therethrough, the lower edge of said opening being relatively high in said wall, a closure for said opening, a smooth flat bottom arranged to be moved substantially vertically within said body, and means to raise and lower said bottom.

3. In a vehicle, the combination with the chassis or running gear, of a substantially cylindrical body, the longitudinal axis of which is substantially vertical and the top end of which is open, a discharge opening through said body, the lower edge of said opening being substantially midway between the top and bottom ends of said body, a circular bottom, the periphery of which engages the inner walls of said body, and means to raise said bottom from the lower end of said body to the lower edge of said opening and to lower said bottom.

4. In a vehicle, the combination with the chassis or running gear of a substantially cylindrical body, the longitudinal axis of which is substantially vertical and the top end of which is open, a discharge opening through said body located vertically over a side of said chassis or running gear, the lower edge of said opening being about midway between the top and bottom ends of said body, a bottom having a packing at the periphery thereof fitting the inner walls of said body, and means to raise and lower said bottom.

5. In a vehicle, the combination with a chassis or running gear, of a plurality of similar body units mounted thereon and having substantially vertical side walls, each unit having an opening over a side of said chassis or running gear and positioned high in said unit above said running gear, a movable closure or gate for each opening, a movable bottom arranged in each unit, and means to lift the bottom of any unit independently of the other units to discharge the contents of that unit by gravity through the opening therein.

6. In a vehicle, the combination with the frame or chassis, of a flooring of thin metal secured to the top of said frame, a substantially cylindrical body unit rigidly secured to said frame at one end thereof, the axis of said unit being substantially vertical with respect to said frame and the top end of said unit being open, an opening through the wall of said unit, and located over a side of said frame with the lower edge of said opening substantially halfway between the ends of said unit, a closure for said opening whereby when said gate is opened a substantial part of a full load in said unit will be discharged by gravity through said opening, a movable bottom in said unit closing the lower end thereof, and means to elevate said bottom to elevate the load between the lower edge of said discharge opening and said bottom.

In witness whereof, we have hereunto set our hands this eighth day of March, 1923.

REGINALD SPEAR.
ALBERT A. THOMPSON.